April 16, 1968  L. L. SNOW  3,377,734

ARTIFICIAL FISHING LURE

Filed Dec. 9, 1964

INVENTOR.
LAWRENCE L. SNOW

3,377,734
ARTIFICIAL FISHING LURE
Lawrence L. Snow, P.O. Box 3722,
St. Petersburg, Fla. 33731
Filed Dec. 9, 1964, Ser. No. 417,123
1 Claim. (Cl. 43—42.24)

This invention relates generally to artificial fishing lures, suitable for either casting or trolling. Such lure bodies ordinarliy are made to resemble shrimp, minnows, worms, frogs, and other small animals which are food for fishes and require a hook or a hook and weight to be attached to the body.

An important object of this invention is to provide an artificial lure which will be extremely lifelike in appearance, resiliency and motion, but will be so durable as to permit its long continued use.

Another object of this invention is to provide a means of attaching a hook and weight to a lure body in a manner so simple that only easily available parts and tools will be needed for the attachment thereof.

Another object of this invention is an arrangement of structural elements of a fishing rig which will permit its use with soft and fragile artificial bodies by the provision of means to transmit the forces exerted by a hooked fish directly to the fishing line, with a minimum imposition of such forces on the artificial bodies and the shank of the hook.

Another object of this invention is to provide for the alignment and distribution of weight pertaining to the structural elements of the fishing rig attached to lure bodies to allow greater stability of the lure body as it is retrieved through water.

Another object of this invention is to provide for a hook and weight to be attached and held outside flexible and resilient bodies of lures in a relatively secure manner by light and durable structural elements that impose a minimum of restraint to the flexibility and resiliency of such bodies when used as fishing lures.

Another object of this invention is to provide for various lure bodies, objects and materials to be superimposed upon an arrangement of structural elements, thereby effecting a fishing lure.

Still another object of this invention is the provision of auxiliary control surfaces adjacent the lure body to provide more lifelike motion of the artificial lure as it is pulled by the fishing line through the water.

Other objects will become apparent from the following description in connection with the accompanying drawing, in which.

Figure 1:
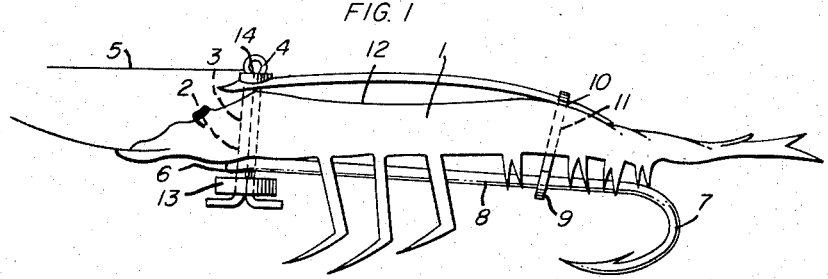
FIGURE 1 shows a side view of the preferred embodiment of this invention attached to a lure body.
Figure 2:
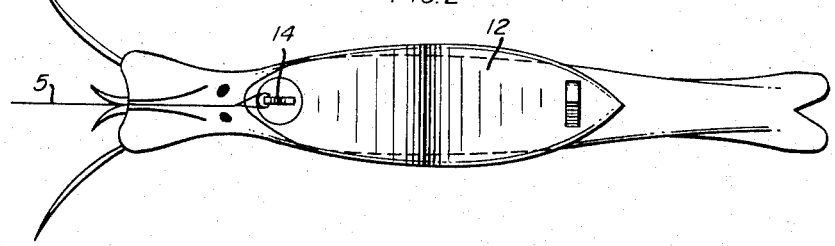
FIGURE 2 shows a top view of said preferred embodiment.
Figure 3:
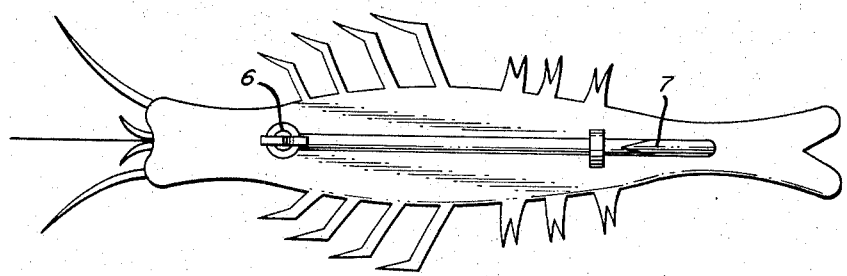
FIGURE 3 shows a bottom view of said preferred embodiment.
Figure 4:
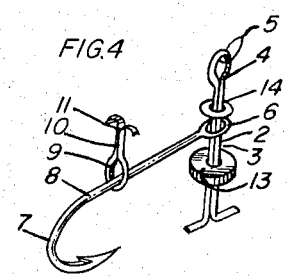
FIGURE 4 shows an exploded view of the preferred embodiment of this invention without lure body and auxiliary control surface attached.
Figure 5:
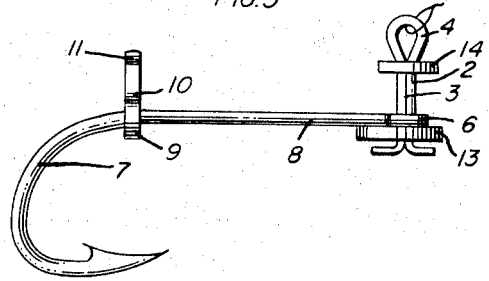
FIGURE 5 shows a side view of said preferred embodiment.

Referring now to the drawings, in which the same numerals in different figures refer to the same parts, the body 1 is shown in the shape of a shrimp, but this invention is equally applicable to artificial lure bodies made in the form of worms, frogs, minnows and other aquatic animals, objects and materials that may attract fish and which may be used in a similar manner with this invention as fishing lures. This body is preferably molded of a flexible, rubber-like material, having a relatively round upper surface and a relatively flat surface on the bottom.

Adjacent the head end of body 1 the shank 2 of cotter pin 3 extends through a center hole of a small thin light round washer 14 that is positioned below eye 4 of said cotter pin to prevent said eye from being pulled down through a flexible body.

Shank 2 of cotter pin 3 is thrust perpendicular through the longitudinal axis of body 1, washer 14 being contiguous to the upper surface of said body, the eye 4 of said cotter pin projecting slightly above said body, for the attachment thereto of fish line 5.

Shank 2 extends below body 1, through the eye 6 of hook 7 and through a center hole of round weight 13 which is preferably a flat alloy lead of sufficient size and weight to govern the stability of the lure while being retrieved in water and for the prevention of stem 2 from being pulled up through a flexible body.

The separate ends of stem 2 extending below weight 13 are spread laterally and opposite each other at 90° angles, parallel to the longitudinal axis of body 1, holding eye 6 of hook 7 against said body and weight 13 against the eye of said hook in a relatively secure manner.

Hook 7 has a shank 8 that is adjacent to the bottom of body 1 and parallel to the longitudinal axis of said body. Shank 8 of said hook is freely enclosed by the eye 9 of a second cotter pin 10 that projects below the botton surface of body 1. The shank 11 of cotter pin 10 is thrust perpendicularly through the longitudinal axis of body 1 adjacent the rear end of said body. The separate ends of shank 11 extending above the upper surface of body 1 are spread laterally in opposite directions against the sides of said body to closely conform with the upper surface of body 1, which holds eye 9 of cotter pin 10 in a relatively secure position and assists in the prevention of shank 11 from being pulled down through the flexible body. Such construction permits the rear of body 1 and other bodies designed from flexible, elastic and resilient materials to either arch or stretch on shank 8 of hook 7 from pressure exerted against the rear of said body by a fish.

A relatively thin, light and flexible control surface 12 may be secured above and adjacent body 1 as shown, being secured thereto by cotter pins 3 and 10. Said control surface is preferably made of light, flexible plastic material, is about 150% of the width of body 1, and somewhat shorter than body 1. Various configurations of said control surface will provide various life-like movements of the lure as it is pulled through the water.

Control surface 12 is generally used only with lure bodies having a rounded upper surface. Small round holes extending through the longitudinal axis of said control surface at the forward and rear ends provide for the insertion of cotter pins 3 and 10 and the retention of the forward end of said control surface below washer 14 on shank 2 of cotter pin 3 and the retention of the rear end of said control surface on shank 11 of cotter pin 10 by the spread and separated ends of cotter pin 10 above the surface of the lure body.

The conventional fishing technique involves fastening a fishing line to the eye 4 of cotter pin 3 at the head which is pulled through the water by trolling or by reeling in the line, with the intention that a fish will be attracted to the lure, strike at it, and imbed in its mouth a barbed hook located toward the rear end of the lure.

The action of the fish in its attempts to dislodge the hook sets up a tension in the hook which must be transmitted to the fishing line.

In the function and operation of this invention attached to various lure bodies, a large fish presumedly strikes the rear of the lure body and engages its mouth upon the point of the hook. Immediately a tension and stress upon the point of the hook is transmitted to the fishing line that is held taut by the fisherman. The arrangement of the structural and tensile strengths of the elements pertaining to the fishing rig provides for the upper section of the shank on the forward cotter pin to bend forwardly slightly under maximum pressure and stress without breaking as the fisherman attempts to reel in the fish that is struggling upon the point of the hook. Under such conditions, the lower section of the shank on the forward cotter pin may bend slightly to the rear as the eye of the hook pulls against the shank of the cotter pin. This movement and stress on the structural elements causes the weight below the eye of the hook to act as a lever and press up against the shank and eye of the fish hook, the weight and the eye of the hook being held on the shank of the forward cotter pin by deformed ends of the cotter pin which are sufficiently strong for this purpose. The rear shank of the hook which is freely enclosed by the rear cotter pin eye provides for a relatively free movement of said shank within the eye when tension and stress is placed upon the point of the hook. Such an arrangement provides for the forward structural elements of the fishing rig to absorb the greatest amount of pressure exerted upon the point of the hook with a minimum of reliance on the intervening support of the body which allows for a relatively strong cotter pin to be used at the forward end of the lure body and a relatively smaller and weaker cotter pin to be used toward the rear end of said lure body.

In conventional small fishing lures designed from light, flexible and resilient materials, the body of the lure has the shank of a hook either partially or wholly enclosed within the body and the fishing line is secured directly to the eye of the hook which projects outside the body of the lure. Due to the construction of such lure bodies it is often impractical to provide a weight within the body that will assist in governing the stability of the lure body as it is retrieved through water which results in unattractive movements that are contrary to those of live bait.

A further disadvantage of heretofore conventional fishing lures designed from light, flexible and resilient materials is that their motion through the water has been often uninteresting, due to the tendency of that part of the body having the shank of the hook within its body to be stretched into a straight, streamlined form by the shank of the hook.

This invention overcomes the above mentioned disadvantages by providing for such lure bodies to be secured above the shank of a hook, allowing greater freedom of movement and a minimum of restriction to the flexibility and resiliency of such bodies which is attractive to fish. Also, it provides a weight for such light lures which will create a greater casting distance of the lure and allow a greater stability of the body as it is retrieved through water.

It will be apparent to one skilled in the art that the described embodiments of this invention demonstrate an arrangement of parts which provide for the transmission of the pull of the hooked fish to the fishing line with a minimum of reliance upon the intervening support of the lure body or the shank of the hook.

Such an arrangement makes possible the use of fragile and attractive materials for lure bodies which have not heretofore been practical.

This arrangement has the further advantage of permitting the flexible lure body to move in the water in a lifelike manner since it is subject to a minimum of stretching forces while being pulled by the line except with the strike of a fish or when the hook is engaged.

It is also apparent that the provision of the weight and of variously shaped auxiliary control surfaces adjacent the lure body will provide an attractive motion to the lure as it is pulled through the water, which would not be obtained from the organic shape of the lure body itself.

By the use of this invention it is possible for unskilled persons to easily and inexpensively assemble fishing lures. Resilient replicas of various bugs, crustaceans, frogs, minnows and shrimp are widely sold at low prices as children's toys and decorations. This invention makes possible their use as fishing lures by the simple attachment thereto of various cotter pins, hooks and weights.

For purposes of disclosure, I have illustrated in the drawings and have described in detail the preferred embodiment of the invention, with the understanding that 1 do not intend to limit my invention to the particular construction and arrangement shown, it being contemplated that various changes may be made by those skilled in the art without departing from the spirit and scope of the appended claim.

What I claim as new, and desire to secure by Letters Patent is:

1. An artificial fishing lure, comprising an elongated lure body molded of a flexible, rubber-like material and having a relatively rounded upper surface and a relatively flat lower surface, a fish hook disposed beneath the lure body and having an eye positioned rearwardly of the forward end of the lure body and a shank extending longitudinally rearwardly and terminating in a barbed point adjacent to the rear end of the body, a first cotter pin having a shank extending perpendicularly downwardly through the lure body and through the eye of the hook, said cotter pin having an eye projecting above the upper surface of the body, a light thin washer having an aperture therein secured to the shank of said cotter pin by the passage of said cotter pin shank through the said aperture and disposed between the eye of said cotter pin and the upper surface of the lure body, a flat, disc-like weight having an aperture therein disposed below the eye of the hook with the cotter pin shank also passing through the aperture in the weight and being deformed below said weight to maintain the attachment of the weight and the forward end of the hook to the lure body; a second cotter pin having a shank extending perpendicularly upwardly through the lure body adjacent the rear end thereof, said second cotter pin having an eye freely enclosing the rear shank of the fish hook and projecting below the lower surface of the lure body, the ends of said second cotter pin projecting above the upper surface of said body and being deformed to generally conform to the shape of the upper surface of said body; a fishing line secured to the eye of the cotter pin, the arrangement of parts permitting the hook shank to slide freely within the eye of the second cotter pin when force is applied to the hook by a hooked fish to cause the shank of the first cotter pin to bend slightly out of the perpendicular and the weight below the hook eye to act as a lever and press upwardly against the shank and eye of the hook, whereby the tension and stress upon the hook is transmitted through the parts to the fishing line.

References Cited

UNITED STATES PATENTS

| | | | |
|---|---|---|---|
| 534,506 | 2/1895 | Hastings | 43—42.37 X |
| 2,765,569 | 10/1956 | Claybrook | 43—42.38 X |
| 3,046,689 | 7/1962 | Woodley | 43—42.38 X |
| 1,986,991 | 1/1935 | Wilson | 43—42.39 X |
| 2,148,784 | 2/1939 | Stewart et al. | 43—42.39 X |
| 2,733,535 | 2/1956 | Rosen | 43—42.39 X |
| 2,948,079 | 8/1960 | Malchert | 43—44.81 X |

SAMUEL KOREN, *Primary Examiner.*

D. L. LEACH, *Assistant Examiner.*